United States Patent
Li et al.

(10) Patent No.: US 12,542,576 B2
(45) Date of Patent: Feb. 3, 2026

(54) METHOD AND APPARATUS FOR GENERATING COMBINATION OUTPUT FOR ACQUISITION BY COHERENTLY COMBINING CORRELATION OUTPUTS OF MULTIPLE CHANNELS

(71) Applicant: Airoha Technology Corp., Hsinchu (TW)

(72) Inventors: Kuan-I Li, Hsinchu (TW); Yuan-Wen Ting, Hsinchu (TW); Chia-Lung Wu, Tainan (TW); Yu-Wei Lee, Hsinchu County (TW); Yi-Jiun Huang, Hsinchu County (TW)

(73) Assignee: Airoha Technology Corp., Hsinchu (TW)

( * ) Notice: Subject to any disclaimer, the term of this patent is extended or adjusted under 35 U.S.C. 154(b) by 78 days.

(21) Appl. No.: 18/665,558

(22) Filed: May 15, 2024

(65) Prior Publication Data
US 2025/0357965 A1   Nov. 20, 2025

(51) Int. Cl.
*H04B 1/709* (2011.01)
*H04B 1/7115* (2018.01)

(52) U.S. Cl.
CPC .......... *H04B 1/709* (2013.01); *H04B 1/7115* (2013.01)

(58) Field of Classification Search
CPC .... H04B 1/709; H04B 1/7093; H04B 1/7115; H04B 1/7117; H04B 2001/70724; H04J 11/0036; H04J 11/0063; H04J 2011/0006
(Continued)

(56) References Cited

U.S. PATENT DOCUMENTS

| 6,850,557 B1 * | 2/2005 | Gronemeyer | G01S 19/30 375/150 |
| 2002/0064214 A1 * | 5/2002 | Hattori | H04B 1/709 375/150 |

(Continued)

FOREIGN PATENT DOCUMENTS

| CA | 2202621 C | * 11/2005 | .......... H04J 13/0048 |
| CN | 101902423 B | 12/2012 | |

OTHER PUBLICATIONS

Chun Yang et al., Joint Acquisition of GNSS Codes via Coherent Combining of Multi-Frequency Composite Quadrature Signals, Proceedings of the 2016 International Technical Meeting, ION ITM 2016, Jan. 25-28, 2016, p. 805-819, Monterey, California, XP093215929 ,Jan. 25, 2016.
(Continued)

*Primary Examiner* — Young T. Tse
(74) *Attorney, Agent, or Firm* — Winston Hsu

(57) ABSTRACT

A multi-hypothesis combination circuit includes a coherent combination circuit and a selection circuit. The coherent combination circuit generates a plurality of coherent combination outputs by performing coherent combination according to a plurality of correlation outputs and a plurality of sign sequences, wherein the plurality of correlation outputs correspond to a plurality of channels, respectively, and each of the plurality of coherent combination outputs is derived from the plurality of correlation outputs and one of the plurality of sign sequences. The selection circuit generates and outputs a combination output of the multi-hypothesis combination circuit according to the plurality of coherent combination outputs.

20 Claims, 6 Drawing Sheets

(58) Field of Classification Search
USPC ....... 375/140, 143, 144, 148, 150, 152, 343; 370/208, 210, 335, 342
See application file for complete search history.

(56) References Cited

U.S. PATENT DOCUMENTS

| | | |
|---|---|---|
| 2003/0227963 A1* | 12/2003 | Dafesh .................... G01S 19/30 375/150 |
| 2006/0285581 A1 | 12/2006 | Mattos |
| 2013/0157602 A1* | 6/2013 | Swarts ..................... H04B 1/16 455/256 |
| 2017/0223668 A1* | 8/2017 | Chang .................. H04J 11/0069 |
| 2024/0039772 A1 | 2/2024 | Chen |

OTHER PUBLICATIONS

Borio, "Coherent, Noncoherent, and Differentially Coherent Combining Techniques for Acquisition of New Composite GNSS Signals", IEEE Transactions on Aerospace and Electronic Systems, vol. 45, No. 3, pp. 1227-1240, Jul. 2009.

Borio, "Data and Pilot Combining for Composite GNSS Signal Acquisition", International Journal of Navigation and Observation, Special Issue: Future GNSS Signals, pp. 1-12, 2008.

Corazza, "Galileo Primary Code Acquisition Based on Multi-hypothesis Secondary Code Ambiguity Elimination", pp. 1-7, Proceedings of the 20th International Technical Meeting of the Satellite Division of The Institute of Navigation (ION GNSS 2007), 2007.

* cited by examiner

METHOD AND APPARATUS FOR GENERATING COMBINATION OUTPUT FOR ACQUISITION BY COHERENTLY COMBINING CORRELATION OUTPUTS OF MULTIPLE CHANNELS

BACKGROUND OF THE INVENTION

1. Field of the Invention

The present invention relates to an acquisition approach, and more particularly, to a method and apparatus for generating a combination output for acquisition by coherently combining correlation outputs of multiple channels.

2. Description of the Prior Art

The global navigation satellite system (GNSS) is often described as an "invisible utility", and is so effective at delivering two essential services-time and position-accurately, reliably and cheaply that many aspects of the modern world have become dependent upon them. Each satellite of the GNSS is equipped with a highly precise atomic clock. When four or more satellites are in view, a GNSS receiver can measure the distance to each satellite by estimating the signal transmission time delay from the satellite to the receiver. From these measurements, a GNSS-embedded device can derive its own position and synchronize to the accurate GNSS system time.

A GNSS satellite signal is modulated by a pseudo random noise (PRN) code. The PRN code is a code sequence with randomly distributed 0's and 1's. Each satellite transmits a unique PRN code (primary code). Hence, the GNSS receiver identifies any of the satellites by its unique PRN code. The unique PRN code is continuously repeated. The GNSS receiver can use a local replica version of the unique PRN code to correlate the received satellite signal for acquisition. The growing demand of location, navigation and positioning services is boosting the development of new signals and modulations that will be adopted by the new GNSS. For example, data (i.e., navigation message) and pilot are transmitted via different channels, respectively. For another example, a primary code and a secondary code are used as spreading codes for one channel. However, during the acquisition process, the GNSS receiver is required to identify a satellite under a condition that all synchronization information, including the secondary code, is unknown. As a result, lots of computations are needed by the GNSS receiver to find a correlation peak within an acquisition space (which is defined by chip phases, Doppler frequency offsets, and PRN codes) for acquisition of a certain satellite. Thus, there is a need for an innovative acquisition approach which can leverage correlation outputs of multiple channels for achieving improved sensitivity.

SUMMARY OF THE INVENTION

One of the objectives of the claimed invention is to provide a method and apparatus for generating a combination output for acquisition by coherently combining correlation outputs of multiple channels.

According to a first aspect of the present invention, an exemplary multi-hypothesis combination circuit is disclosed. The exemplary multi-hypothesis combination circuit includes a coherent combination circuit and a selection circuit. The coherent combination circuit is arranged to generate a plurality of coherent combination outputs by performing coherent combination according to a plurality of correlation outputs and a plurality of sign sequences, wherein the plurality of correlation outputs correspond to a plurality of channels, respectively, and each of the plurality of coherent combination outputs is derived from the plurality of correlation outputs and one of the plurality of sign sequences. The selection circuit is arranged to generate and output a combination output of the multi-hypothesis combination circuit according to the plurality of coherent combination outputs.

According to a second aspect of the present invention, an exemplary multi-hypothesis combination method is disclosed. The exemplary multi-hypothesis combination method includes: generating, by a coherent combination circuit, a plurality of coherent combination outputs by performing coherent combination according to a plurality of correlation outputs and a plurality of sign sequences, wherein the plurality of correlation outputs correspond to a plurality of channels, respectively, and each of the plurality of coherent combination outputs is derived from the plurality of correlation outputs and one of the plurality of sign sequences; and generating and outputting a combination output according to the plurality of coherent combination outputs.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
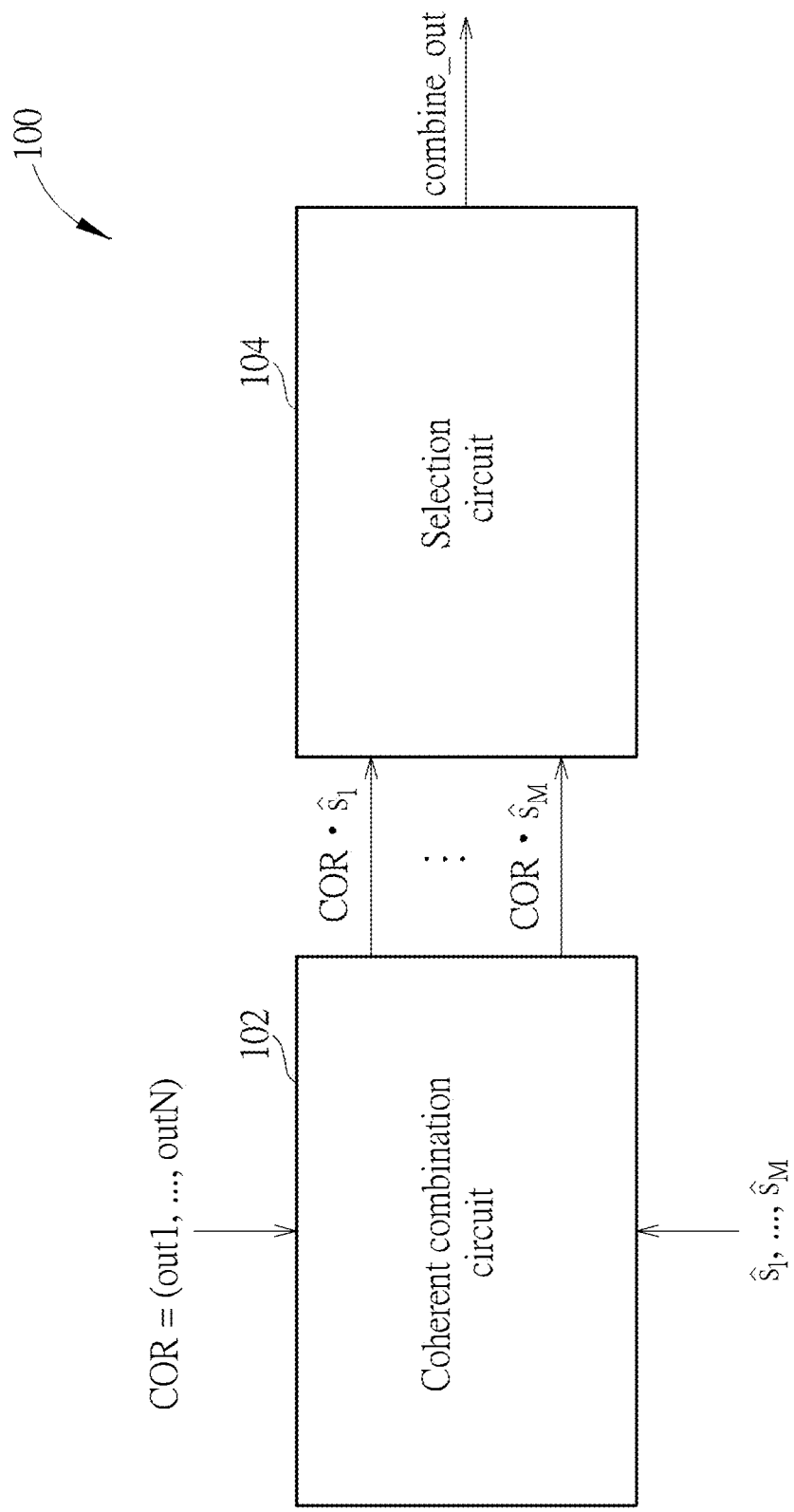
FIG. 1 is a block diagram of a multi-hypothesis combination circuit according to an embodiment of the present invention.

FIG. 1 is a block diagram of a multi-hypothesis combination circuit according to an embodiment of the present invention. The multi-hypothesis combination circuit 100 includes a coherent combination circuit 102 and a selection circuit 104. The coherent combination circuit 102 is arranged to generate a plurality of coherent combination outputs COR·ŝ$_1$, . . . , COR·ŝ$_M$ by performing coherent combination according to a plurality of correlation outputs out1, . . . , outN (N≥2) and a plurality of sign sequences ŝ$_1$, . . . , ŝ$_M$ (M≥2). Different sign sequences ŝ$_1$, . . . , ŝ$_M$ correspond to different hypotheses, respectively. Each sign sequence ŝ$_i$ (1≤i≤M) includes N sign values {s$_1$, . . . , s$_N$}, where s$_1$, . . . , s$_N$ ∈ {+1, −1}. The correlation outputs out1, . . . , outN correspond to a plurality of channels, respectively. Each of the coherent combination outputs COR·ŝ$_1$, . . . , COR·ŝ$_M$ is derived from the correlation outputs COR=(out1, . . . , outN) and one of the sign sequences ŝ$_1$, . . . , ŝ$_M$. For example, COR. ŝ$_i$=s$_1$·out1+ . . . +s$_N$·outN. The selection circuit 104 is arranged to generate and output a combination output combine_out of the multi-hypothesis combination circuit 100 according to the coherent combination outputs COR·ŝ$_1$, . . . , COR·ŝ$_M$.

By way of example, but not limitation, the multi-hypothesis combination circuit 100 may be used in a GNSS receiver. However, this is for illustrative purposes only, and is not meant to be a limitation of the present invention. In practice, any application using the proposed multi-hypothesis combiner design falls within the scope of the present invention.

Figure 2:
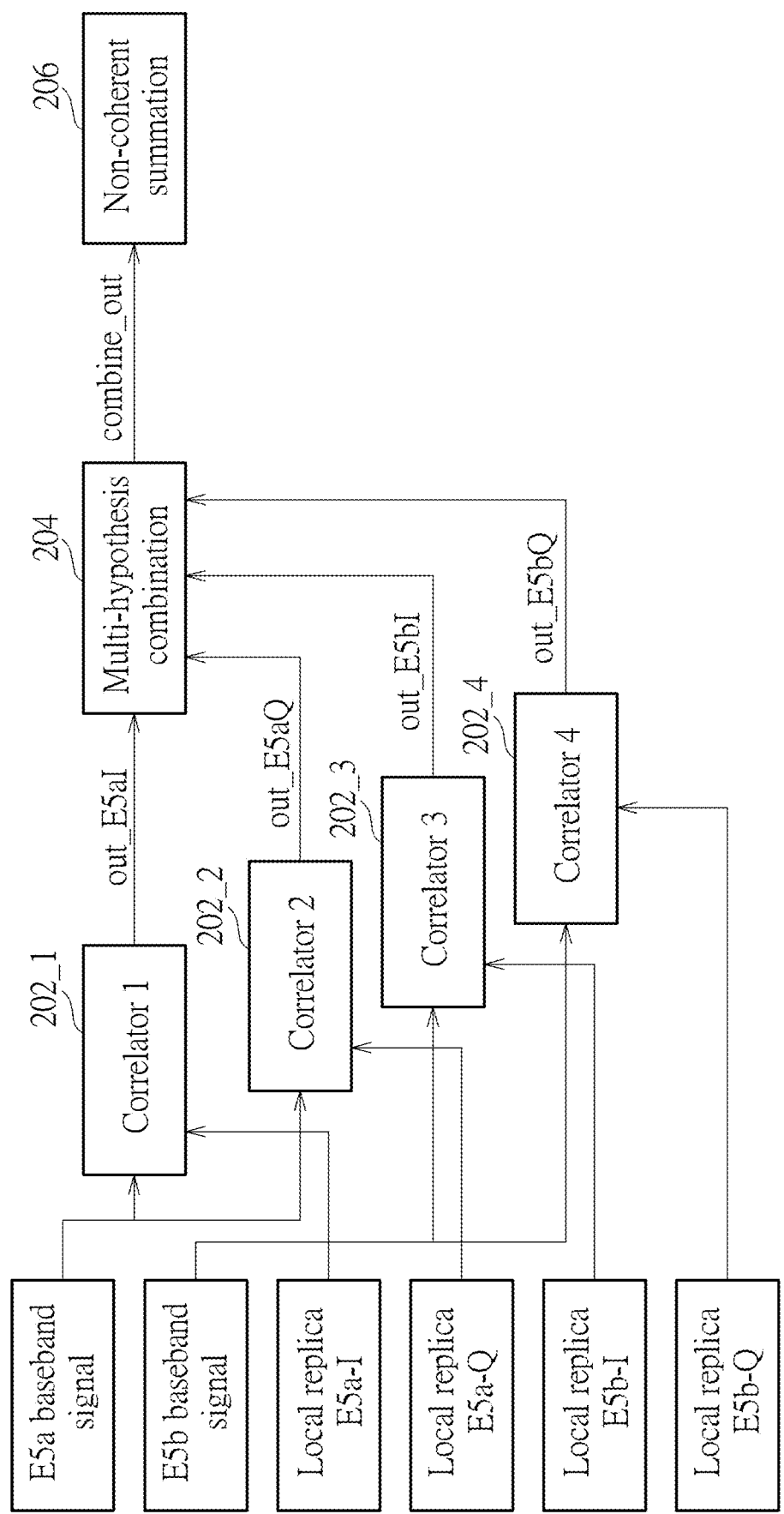
FIG. 2 is a diagram illustrating a GNSS receiver using the proposed multi-hypothesis combiner design for acquisition according to an embodiment of the present invention.

FIG. 2 is a diagram illustrating a GNSS receiver using the proposed multi-hypothesis combiner design for acquisition according to an embodiment of the present invention. For better comprehension of technical features of the present invention, the following assumes that the proposed multi-hypothesis combiner design is used for acquisition of Galileo E5 signals, including E5a and E5b signals. The E5a signal is transmitted via an E5a I-channel (which is a data channel) and an E5a Q-channel (which is a pilot channel). Similarly, the E5b signal is transmitted via an E5b I-channel (which is a data channel) and an E5b Q-channel (which is a pilot channel). As shown in FIG. 2, the GNSS receiver includes four correlator circuits (labeled by "Correlator 1", "Correlator 2", "Correlator 3", and "Correlator 4") 202_1, 202_2, 202_3, 202_4, a multi-hypothesis combination circuit (labeled by "Multi-hypothesis combination") 204, and a non-coherent summation circuit (labeled by "Non-coherent summation") 206. The correlator circuit 202_1 receives an E5a baseband signal (particularly, E5a-I baseband received signal), and performs correlation computation according to a local replica (primary code) of E5a-I and the E5a baseband signal, to generate a correlation output out E5aI. The correlator circuit 202_2 receives an E5a baseband signal (particularly, E5a-Q baseband received signal), and performs correlation computation according to a local replica (primary code) of E5a-Q and the E5a baseband signal, to generate a correlation output out E5aQ. The correlator circuit 202_3 receives an E5b baseband signal (particularly, E5b-I baseband received signal), and performs correlation computation according to a local replica (primary code) of E5b-I and the E5b baseband signal, to generate a correlation output out E5bI. The correlator circuit 202_4 receives an E5b baseband signal (particularly, E5b-Q baseband received signal), and performs correlation computation according to a local replica (primary code) of E5b-Q and the E5b baseband signal, to generate a correlation output out E5bQ.

The multi-hypothesis combination circuit 204 may be implemented based on the architecture of the multi-hypothesis combination circuit 100 shown in FIG. 1. The correlation outputs out1-outN (N=4) may be derived from the correlation outputs out E5aI, out E5aQ, out E5bI, out E5bQ generated by the correlator circuits 202_1-202_4. For example, some of the correlation outputs out E5aI, out E5aQ, out E5bI, out E5bQ may directly serve as some of the correlation outputs out1-outN (N=4), and some of the correlation outputs out E5aI, out E5aQ, out E5bI, out E5b may serve as some of the correlation outputs out1-outN (N=4) after certain arithmetic processing (e.g., multiplication of j).

The combination output combine_out generated from the multi-hypothesis combination circuit 204 may be an absolute value (or magnitude/norm) of a coherent combination output (which is a complex number), and may be further provided to the following non-coherent summation circuit 206 for non-coherent integration. For example, the GNSS receiver can obtain one combination output combine_out (k) per unit correlation time (e.g., 1 ms). In accordance with the sensitive requirement, the GNSS receiver may use the non-coherent summation circuit 206 to accumulate K combination outputs combine_out (k) (i.e., $$\sum_{k=1}^{K} \text{combine\_out}(k)).$$

Since the present invention is focused on the multi-hypothesis combination circuit 204, the principle of the non-coherent summation circuit 206 is omitted here for brevity. Further details of the multi-hypothesis combination circuit 204 are described as below with reference to the accompanying drawings.

Figure 3:
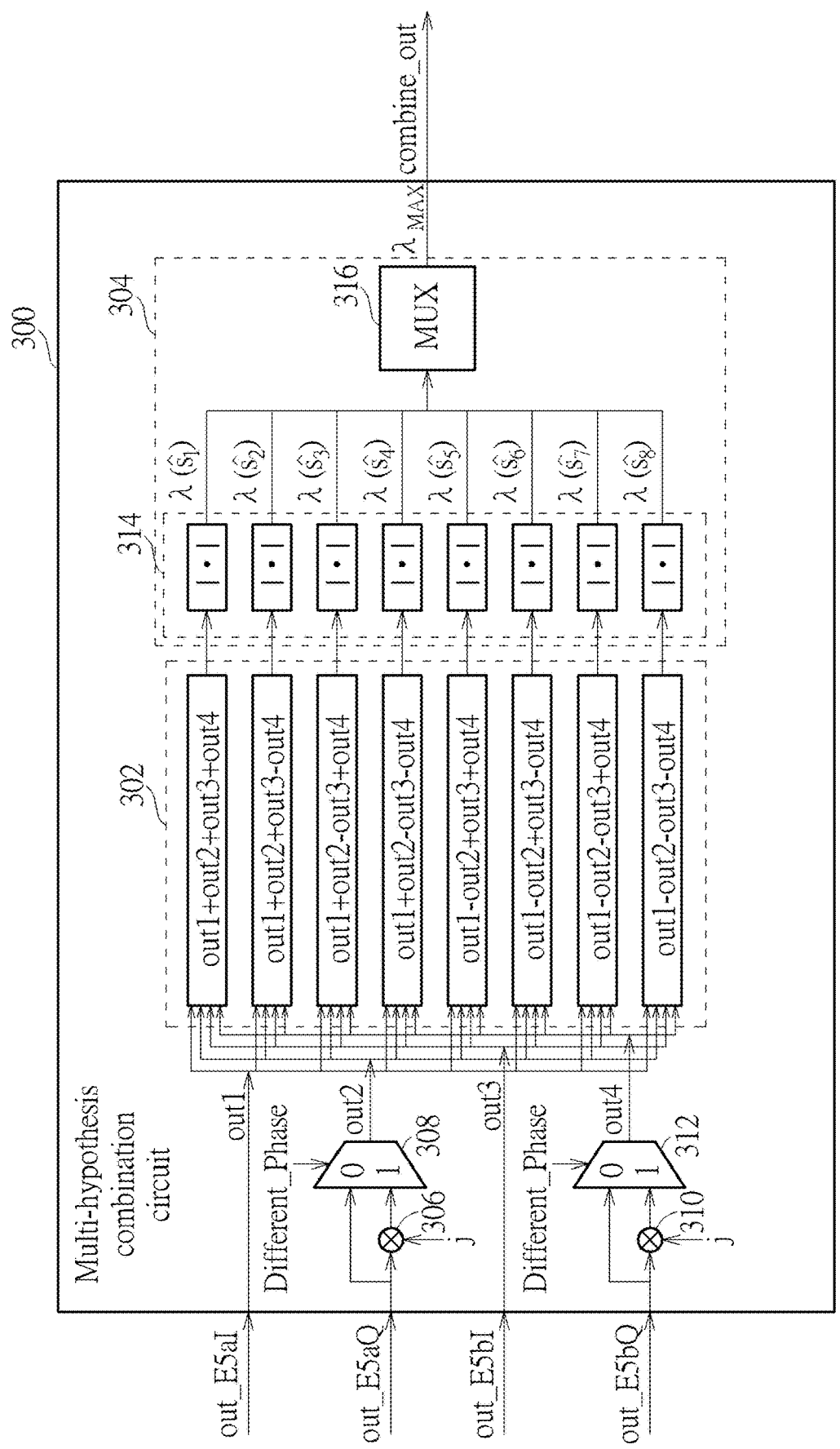
FIG. 3 is a diagram illustrating implementation of a multi-hypothesis combination circuit according to an embodiment of the present invention.

FIG. 3 is a diagram illustrating implementation of a multi-hypothesis combination circuit according to an embodiment of the present invention. The multi-hypothesis combination circuit 204 shown in FIG. 2 may be implemented using the multi-hypothesis combination circuit 300 shown in FIG. 3. Implementation of the multi-hypothesis combination circuit 300 is based, at least partly, on the architecture of the multi-hypothesis combination circuit 100 shown in FIG. 1. As shown in FIG. 3, the multi-hypothesis combination circuit 300 includes a coherent combination circuit 302 and a selection circuit 304, and further includes a plurality of multiplier circuits 306, 310, and a plurality of multiplexer circuits 308, 312. It should be noted that the multi-hypothesis combination circuit 300 may be modified to meet requirements of a different GNSS system. For example, multiplier circuits 306, 310 and multiplexer circuits 308, 312 may be omitted, depending upon actual design considerations and/or actual GNSS system requirements. For another example, the number of correlation outputs used by the multi-hypothesis combination circuit 300 may be adjusted, depending upon actual design considerations and/or actual GNSS system requirements.

Regarding Galileo E5 signal acquisition in this embodiment, the correlation output out1 received by the coherent combination circuit 302 is the same as the correlation output out E5aI (i.e., out1=out E5aI), the correlation output out2 received by the coherent combination circuit 302 is set by j*out_E5aQ, the correlation output out3 received by the coherent combination circuit 302 is directly set by the correlation output out E5bI (i.e., out3=out E5bI), and the correlation output out4 received by the coherent combination circuit 302 is set by j*out_E5bQ. The multiplier circuit 306 is arranged to multiply the correlation output out_E5aQ of the pilot channel (i.e., E5a Q-channel) by j to generate a multiplication result j*out_E5aQ. The multiplier circuit 310 is arranged to multiply the correlation output out_E5bQ of the pilot channel (i.e., E5b Q-channel) by j to generate a multiplication result j*out_E5bQ. The multiplexer circuit 308 is arranged to select and output one of the multiplication result j*out_E5aQ and the correlation output out_E5aQ according to a phase difference Different Phase between the data channel (i.e., E5a I-channel) and the pilot channel (i.e., E5a Q-channel). The multiplexer circuit 312 is arranged to select and output one of the multiplication result j*out_E5bQ and the correlation output out_E5bQ according to the phase difference Different Phase between the data channel (i.e., E5b I-channel) and the pilot channel (i.e., E5b Q-channel). Since there is a 90-degree phase difference between the data channel and the pilot channel according to the Galileo E5 specification, the multiplexer circuit 308 outputs the multiplication result j*out_E5aQ under control of Different Phase=1, and the multiplexer circuit 312 outputs the multiplication result j*out_E5bQ under control of Different Phase=1.

It should be noted that the proposed multi-hypothesis combiner design as illustrated in FIG. 1 can be applicable to more than one GNSS system. In some embodiments of the present invention, the proposed multi-hypothesis combiner design may be used for acquisition of Galileo E1 signals, including E1B and E1C signals. The E1B signal is used for data (navigation message) transmission and transmitted via a data channel, and the E1C signal is used for pilot transmission and transmitted via a pilot channel. Since the data channel and the pilot channel are in phase, a multiplexer circuit (e.g., 308 or 312) outputs a correlation output of the pilot channel under control of Different Phase=0.

Figure 4:
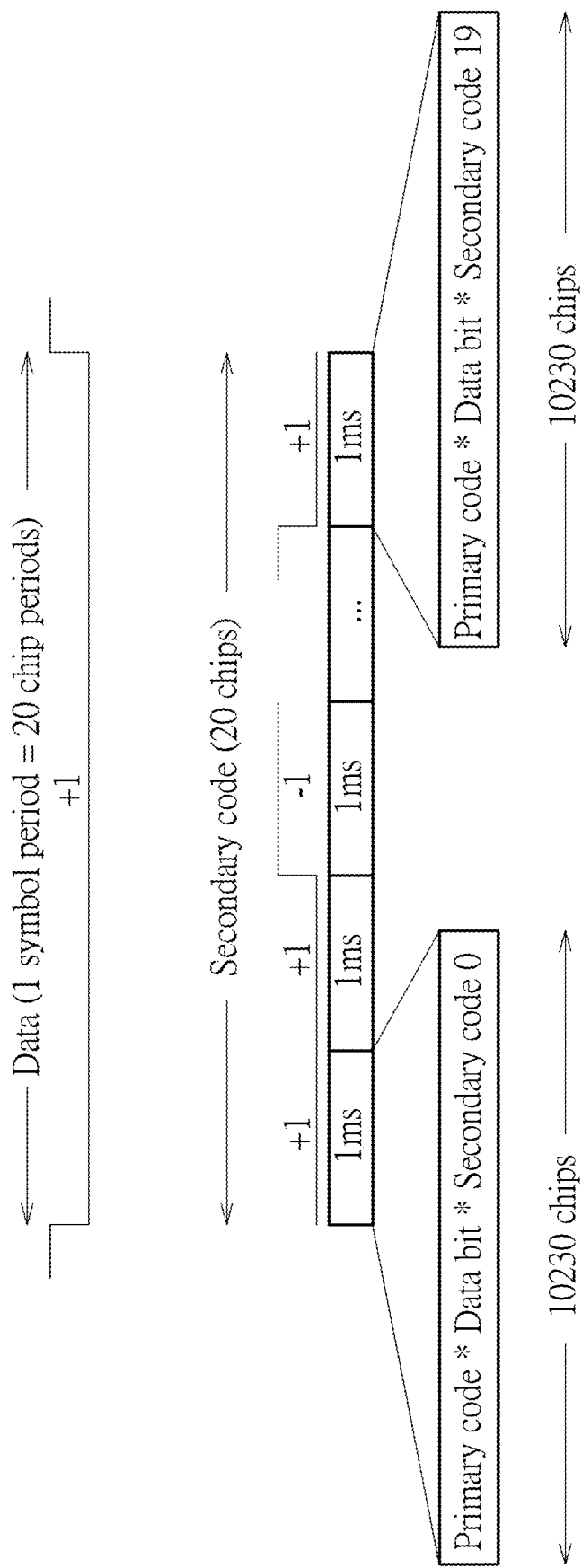
FIG. 4 is a diagram illustrating an E5a I-channel (data channel) format.
Figure 5:
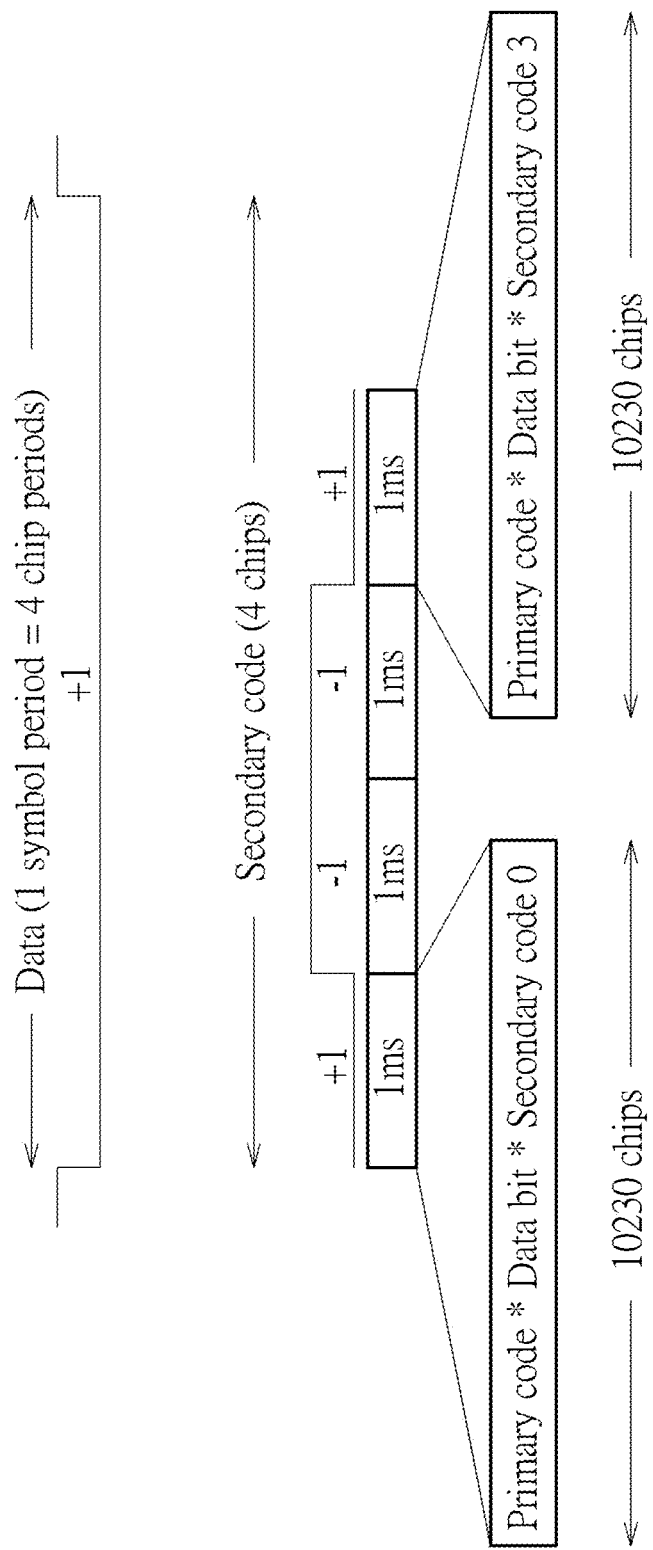
FIG. 5 is a diagram illustrating an E5b I-channel (data channel) format.
Figure 6:
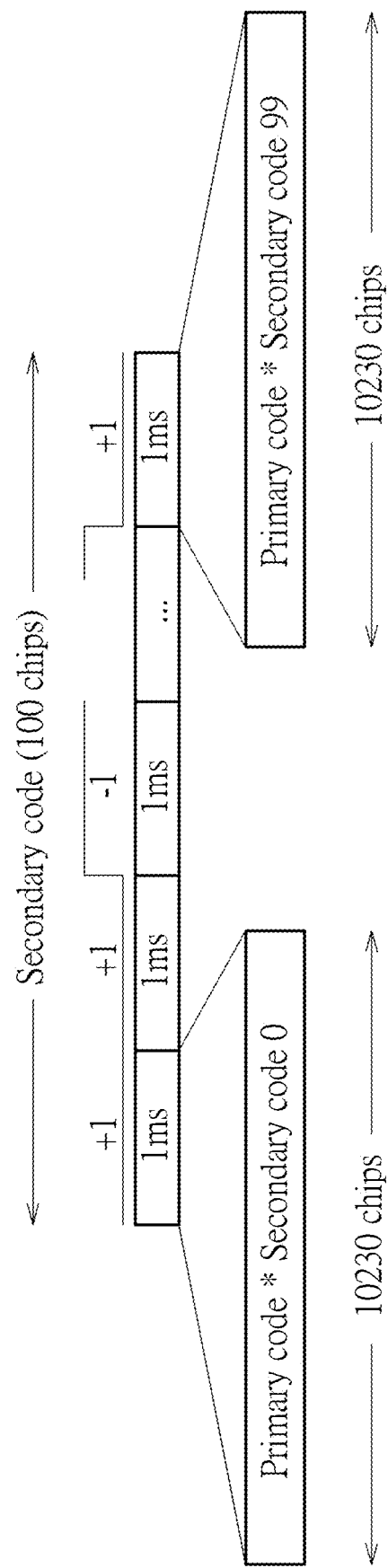
FIG. 6 is a diagram illustrating an E5a/E5b Q-channel (pilot channel) format.

In this embodiment, the proposed multi-hypothesis combiner design is used for acquisition of Galileo E5 signals. The coherent combination circuit 302 generates a plurality of coherent combination outputs according to correlation outputs out1-out4 and different sign sequences (i.e., different hypotheses) $\hat{s}_1$-$\hat{s}_8$. The satellite data is transmitted by using a binary phase shift keying (BPSK) modulation scheme. Hence, a logic value "0" of the data, the primary code, and the secondary code is transformed to "+1" for BPSK modulation, and a logic value "1" of the data, the primary code, and the secondary code is transformed to "−1" for BPSK modulation. The sign sequences $\hat{s}_1$-$\hat{s}_8$ are used to test all possible data bits {+1, −1} and secondary code chips {+1, −1} for transmission of one primary code sequence (e.g., 10230 chips per millisecond). FIG. 4 is a diagram illustrating an E5a I-channel (data channel) format, where primary code (10230 chips)*data bit (+1 or −1)*secondary code (+1 or −1) is transmitted per millisecond. FIG. 5 is a diagram illustrating an E5b I-channel (data channel) format, where primary code (10230 chips)*data bit (+1 or −1)*secondary code (+1 or −1) is transmitted per millisecond. FIG. 6 is a diagram illustrating an E5a/E5b Q-channel (pilot channel) format, where primary code (10230 chips)*secondary code (+1 or −1) is transmitted per millisecond.

It should be noted that each of the correlation outputs out1-out4 is generated based on correlation of the primary code (10230 chips) per millisecond. Regarding the E5a/E5b I-channel (data channel) signal, the actual data bit and secondary code are unknown during the acquisition process, and all possible values {+1, −1} of data bit*secondary code can be tested. Similarly, regarding the E5a/E5b Q-channel (pilot channel) signal, the actual secondary code is unknown during the acquisition process, and all possible values {+1, −1} of secondary code can be tested.

Regarding the correlation output out1 of the E5a I-channel (data channel), primary code*data bit*secondary code transmitted in one millisecond may be (+1)*out1 or (−1)*out1. Regarding the correlation output out2 of the E5a Q-channel (pilot channel), primary code*secondary code transmitted in one millisecond may be (+1)*out2 or (−1)*out2. Regarding the correlation output out3 of the E5b I-channel (data channel), primary code*data bit*secondary code transmitted in one millisecond may be (+1)*out3 or (−1)*out3. Regarding the correlation output out4 of the E5b Q-channel (pilot channel), primary code*secondary code in one millisecond may be (+1)*out4 or (−1)*out4. Hence, the coherent combination circuit 302 is arranged to generate a plurality of coherent combination outputs (out1, . . . , out4)·$\hat{s}_i$=$s_1$·out1+ . . . +$s_4$·out4, where $\hat{s}_i$=($s_1$, . . . , $s_4$) and $s_1$, . . . , $s_4 \in$ {+1, −1}.

In this embodiment, the selection circuit 304 includes a hypothesis metric value computation circuit 314 and a maximum value selection circuit (labeled by "MAX") 316. The hypothesis metric value computation circuit 314 is arranged to calculate an absolute value (or magnitude/norm) of a coherent combination output $s_1$·out1+ . . . +$s_4$·out4 as a hypothesis metric value. Since |(out1, . . . , out4)·$\hat{s}_i$|=|(out1, . . . , out4)·(−$\hat{s}_i$)|, each hypothesis (sign sequence) $\hat{s}_i$ has two possibilities, and only one of the two possibilities is selected and tested by the coherent combination circuit 302. The settings of hypotheses (sign sequences) $\hat{s}_i$ are listed in the following table.

TABLE 1

| Combine 2 channels | Combine 3 channels | Combine 4 channels |
|---|---|---|
| $\hat{s}_1$ = (1, 1) or (−1, −1)<br>$\hat{s}_2$ = (1, −1) or (−1, 1) | $\hat{s}_1$ = (1, 1, 1) or (−1, −1, −1)<br>$\hat{s}_2$ = (1, 1, −1) or (−1, −1, 1)<br>$\hat{s}_3$ = (1, −1, 1) or (−1, 1, −1)<br>$\hat{s}_4$ = (1, −1, −1) or (−1, 1, 1) | $\hat{s}_1$ = (1, 1, 1, 1) or (−1, −1, −1, −1)<br>$\hat{s}_2$ = (1, 1, 1, −1) or (−1, −1, −1, 1)<br>$\hat{s}_3$ = (1, 1, −1, 1) or (−1, −1, 1, −1)<br>$\hat{s}_4$ = (1, 1, −1, −1) or (−1, −1, 1, 1)<br>$\hat{s}_5$ = (1, −1, 1, 1) or (−1, 1, −1, −1)<br>$\hat{s}_6$ = (1, −1, 1, −1) or (−1, 1, −1, 1)<br>$\hat{s}_7$ = (1, −1, −1, 1) or (−1, 1, 1, −1)<br>$\hat{s}_8$ = (1, −1, −1, −1) or (−1, 1, 1, 1) |

Consider a 4-channel combination case where $\hat{s}_1$=(1, 1, 1, 1), $\hat{s}_2$=(1, 1, 1, −1), $\hat{s}_3$=(1, 1, −1, 1), $\hat{s}_4$=(1, 1, −1, −1), $\hat{s}_5$=(1, −1, 1, 1), $\hat{s}_6$=(1, −1, 1, −1), $\hat{s}_7$=(1, −1, −1, 1), and $\hat{s}_8$=(1, −1, −1, −1). Eight coherent combination outputs, including out1+out2+out3+out4, out1+out2+out3−out4, out1+out2−out3+out4, out1+out2−out3−out4, out1−out2+out3+out4, out1−out2+out3−out4, out1−out2−out3+out4, out1−out2−out3−out4, are generated by coherent combination, as illustrated in FIG. 4. As a person skilled in the art can readily understand the coherent combination outputs generated using other settings of $\hat{s}_1$, . . . , $\hat{s}_8$, further description is omitted here for brevity.

Regarding the embodiment shown in FIG. 3, all of the correlation outputs out1-out4 are coherently combined for improving the sensitivity. However, this is for illustrative purposes only, and is not meant to be a limitation of the present invention. In an alternative design, only two or three of the four correlation outputs out1-out4 may be coherently combined for improving the sensitivity. The same design concept can be applied to other GNSS systems that use multiple channels for data and pilot transmission.

Consider a 3-channel combination case where $\hat{s}_1=(1, 1, 1)$, $\hat{s}_2=(1, 1, -1)$, $\hat{s}_3=(1, -1, 1)$, and $\hat{s}_4=(1, -1, -1)$. Four coherent combination outputs, including out1+out2+out3, out1+out2−out3, out1−out2+out3, out1−out2−out3, are generated by coherent combination. As a person skilled in the art can readily understand the coherent combination outputs generated using other settings of $\hat{s}_1$-$\hat{s}_4$, further description is omitted here for brevity.

Consider a 2-channel combination case where $\hat{s}_1=(1, 1)$ and $\hat{s}_2=(1, -1)$. Two coherent combination outputs, including out1+out2, out1−out2, are generated by coherent combination. As a person skilled in the art can readily understand the coherent combination outputs generated using other settings of $\hat{s}_1$ and $\hat{s}_2$, further description is omitted here for brevity.

The hypothesis metric value computation circuit 314 is arranged to generate hypothesis metric values $\lambda(\hat{s}_1)$, $\lambda(\hat{s}_2)$, $\lambda(\hat{s}_3)$, $\lambda(\hat{s}_4)$, $\lambda(\hat{s}_5)$, $\lambda(\hat{s}_6)$, $\lambda(\hat{s}_7)$, $\lambda(\vec{s}_8)$ of the coherent combination outputs (e.g., out1+out2+out3+out4, out1+out2+out3−out4, out1+out2−out3+out4, out1+out2−out3−out4, out1−out2+out3+out4, out1−out2+out3−out4, out1−out2−out3+out4, out1−out2−out3−out4), respectively. In this embodiment, the hypothesis metric value computation circuit 314 calculates an absolute value (or magnitude/norm) of a coherent combination output (which is a complex number) as a hypothesis metric value of the coherent combination output. After the hypothesis metric values $\lambda(\hat{s}_1)$-$\lambda(\hat{s}_8)$ are generated, the maximum value selection circuit 316 selects and outputs a maximum value AMAX among the hypothesis metric values $\lambda(\hat{s}_1)$-$\lambda(\hat{s}_8)$ as the combination output combine_out of the multi-hypothesis combination circuit 300 (i.e., combine_out=$\lambda_{MAX}$=MAX($\lambda(\hat{s}_1)$, $\lambda(\hat{s}_2)$, $\lambda(\hat{s}_3)$, $\lambda(\hat{s}_4)$, $\lambda(\hat{s}_5)$, $\lambda(\hat{s}_6)$, $\lambda(\hat{s}_7)$, $\lambda(\hat{s}_8)$)).

Compared to the non-coherent combining (e.g., summation of absolute values of multiple complex correlation outputs or summation of squared absolute values of multiple complex correlation outputs) with non-coherent loss, the proposed multi-hypothesis combiner design employs coherent combining (e.g., summation of multiple complex correlation outputs) can have higher sensitivity during acquisition. In addition, the proposed multi-hypothesis combiner design is applicable to a variety of GNSS systems, and can be used to coherently combine correlation outputs of any number of channels (e.g., 2 channels, 3 channels, or 4 channels).

In some embodiments of the present invention, different channels include at least one data channel and at least one pilot channel at an L1 band, and each of the channels uses a primary code and a secondary code as spreading codes. For example, the proposed multi-hypothesis combiner design is used for acquisition of Galileo E1B and E1C signals (2 channels).

In some embodiments of the present invention, different channels include at least one data channel and at least one pilot channel at an L5 band, and each of the channels uses a primary code and a secondary code as spreading codes. For example, the proposed multi-hypothesis combiner design is used for acquisition of GPS L5-I and L5-Q signals (2 channels). For another example, the proposed multi-hypothesis combiner design is used for acquisition of Beidou B2a-I, B2a-Q, and B2b-I signals (3 channels) or a subset of Beidou B2a-I, B2a-Q, and B2b-I signals (2 channels). For yet another example, the proposed multi-hypothesis combiner design is used for acquisition of Galileo E5a-I, E5a-Q, E5b-I, and E5b-Q signals (4 channels), or a subset of Galileo E5a-I, E5a-Q, E5b-I, and E5b-Q signals (2 channels or 3 channels).

In some embodiments of the present invention, different channels include at least one data channel and at least one pilot channel at an L6 band, and each of the channels uses a primary code and a secondary code as spreading codes. For example, the proposed multi-hypothesis combiner design is used for acquisition of Galileo E6B and E6C signals (2 channels).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-hypothesis combination circuit comprising:
   a coherent combination circuit, arranged to generate a plurality of coherent combination outputs by performing coherent combination according to a plurality of correlation outputs and a plurality of sign sequences, wherein the plurality of correlation outputs correspond to a plurality of channels, respectively, and each of the plurality of coherent combination outputs is derived from the plurality of correlation outputs and one of the plurality of sign sequences; and
   a selection circuit, arranged to generate and output a combination output of the multi-hypothesis combination circuit according to the plurality of coherent combination outputs.

2. The multi-hypothesis combination circuit of claim 1, wherein the selection circuit comprises:
   a hypothesis metric value computation circuit, arranged to generate a plurality of hypothesis metric values of the plurality of coherent combination outputs, respectively; and
   a maximum value selection circuit, arranged to select and output a maximum value among the plurality of hypothesis metric values as the combination output of the multi-hypothesis combination circuit.

3. The multi-hypothesis combination circuit of claim 2, wherein each of the plurality of hypothesis metric values is an absolute value.

4. The multi-hypothesis combination circuit of claim 1, wherein the multi-hypothesis combination circuit is a part of a global navigation satellite system (GNSS) receiver.

5. The multi-hypothesis combination circuit of claim 4, wherein the plurality of channels comprises at least one data channel and at least one pilot channel.

6. The multi-hypothesis combination circuit of claim 5, wherein the multi-hypothesis combination circuit receives a correlation output of a data channel and a correlation output of a pilot channel, and further comprises:
   a multiplier circuit, arranged to multiply the correlation output of the pilot channel by $\sqrt{-1}$ to generate a multiplication result; and
   a multiplexer circuit, arranged to select and output one of the multiplication result and the correlation output of the pilot channel as one of the plurality of correlation outputs according to a phase difference between the data channel and the pilot channel.

7. The multi-hypothesis combination circuit of claim 5, wherein each of the plurality of channels uses a secondary code as one of spreading codes.

8. The multi-hypothesis combination circuit of claim 7, wherein the at least one data channel and the at least one pilot channel are at an L1 band.

9. The multi-hypothesis combination circuit of claim 7, wherein the at least one data channel and the at least one pilot channel are at an L5 band.

10. The multi-hypothesis combination circuit of claim 7, wherein the at least one data channel and the at least one pilot channel are at an L6 band.

11. A multi-hypothesis combination method comprising:
generating, by a coherent combination circuit, a plurality of coherent combination outputs by performing coherent combination according to a plurality of correlation outputs and a plurality of sign sequences, wherein the plurality of correlation outputs correspond to a plurality of channels, respectively, and each of the plurality of coherent combination outputs is derived from the plurality of correlation outputs and one of the plurality of sign sequences; and
generating and outputting a combination output according to the plurality of coherent combination outputs.

12. The multi-hypothesis combination method of claim 11, wherein generating and outputting the combination output according to the plurality of coherent combination outputs comprises:
generating a plurality of hypothesis metric values of the plurality of coherent combination outputs, respectively; and
selecting and outputting a maximum value among the plurality of hypothesis metric values as the combination output.

13. The multi-hypothesis combination method of claim 12, wherein each of the plurality of hypothesis metric values is an absolute value.

14. The multi-hypothesis combination method of claim 11, wherein the multi-hypothesis combination method is employed by a global navigation satellite system (GNSS) receiver.

15. The multi-hypothesis combination method of claim 14, wherein the plurality of channels comprises at least one data channel and at least one pilot channel.

16. The multi-hypothesis combination method of claim 15, further comprising:
receiving a correlation output of a data channel and a correlation output of a pilot channel;
multiplying the correlation output of the pilot channel by $\sqrt{-1}$ to generate a multiplication result; and
selecting and outputting one of the multiplication result and the correlation output of the pilot channel as one of the plurality of correlation outputs according to a phase difference between the data channel and the pilot channel.

17. The multi-hypothesis combination method of claim 15, wherein each of the plurality of channels uses a secondary code as one of spreading codes.

18. The multi-hypothesis combination method of claim 17, wherein the at least one data channel and the at least one pilot channel are at an L1 band.

19. The multi-hypothesis combination method of claim 17, wherein the at least one data channel and the at least one pilot channel are at an L5 band.

20. The multi-hypothesis combination method of claim 17, wherein the at least one data channel and the at least one pilot channel are at an L6 band.

* * * * *